Oct. 5, 1954     H. A. COOK     2,690,707
COTTON CHOPPER

Filed Dec. 23, 1949     3 Sheets-Sheet 1

Inventor
Henry A. Cook

By *Clarence A. O'Brien and Harvey B. Jacobson*
Attorneys

Inventor
Henry A. Cook

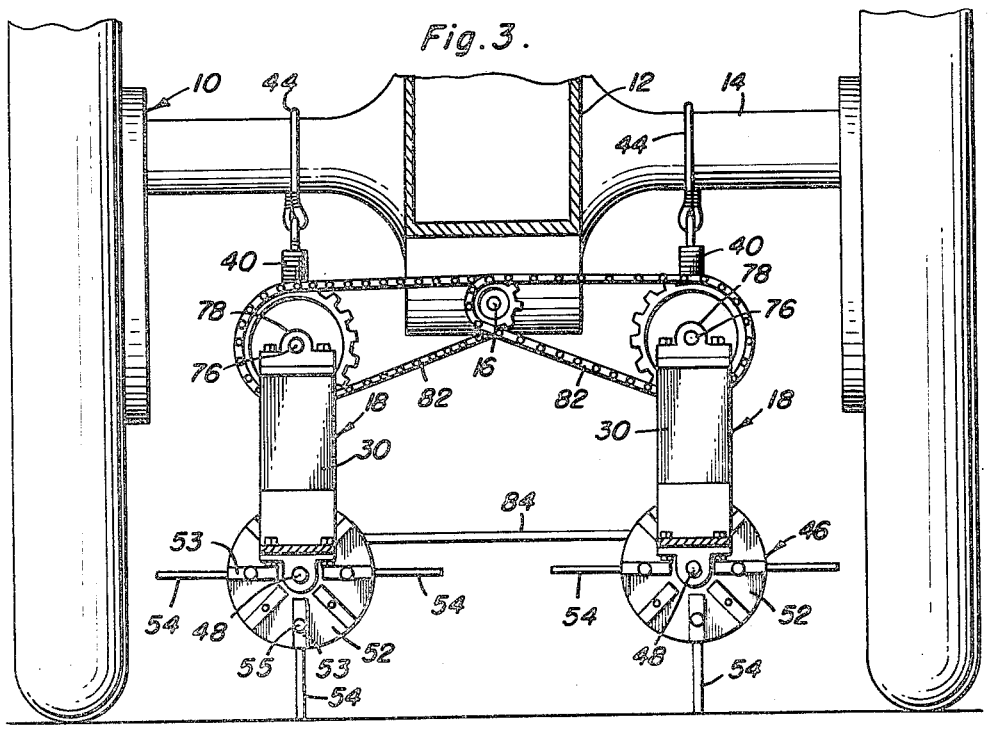
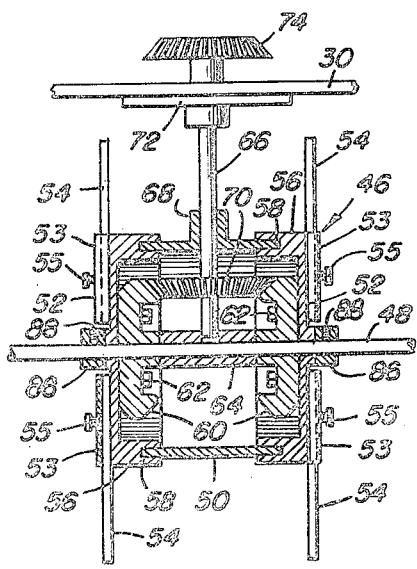
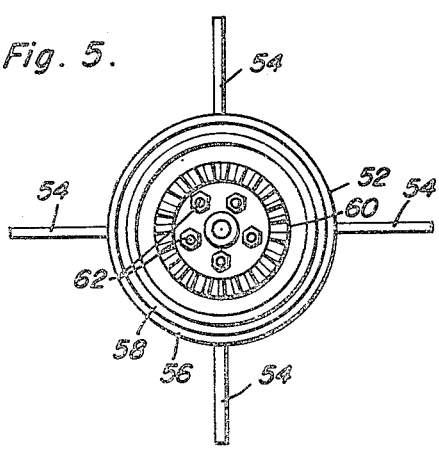

Patented Oct. 5, 1954

2,690,707

UNITED STATES PATENT OFFICE 2,690,707

COTTON CHOPPER

Henry A. Cook, Marvell, Ark.

Application December 23, 1949, Serial No. 134,629

8 Claims. (Cl. 97—15)

This invention relates to new and useful improvements and structural refinements in cotton choppers, and the principal object of the invention is to efficiently and expeditiously thin the cotton plants, destroy and cover up grass between the plants and cultivate the soil so as to afford a rich and plentiful crop.

In particular, the invention concerns itself with a cotton chopper which, in the manner of an attachment, is carried and actuated by a conventional tractor, some of the advantages of the invention residing in its simplicity of construction, in its efficient operation, and in its adaptability for use with tractors of different sizes and types.

With the above more important objects and features in view and such other objects and features as may become apparent as this specification proceeds, the invention consists essentially of the arrangement and construction of parts as illustrated in the accompanying drawings, in which:

Figure 3 is a fragmentary sectional view, taken substantially in the plane of the line 3—3 in Figure 1;

Figure 4 is a cross-sectional detail, taken substantially in the plane of the line 4—4 in Figure 2;

Figure 5 is an elevational view of one of the chopping members and bevelled gears for actuating the same.

Like characters of reference are employed to designate like parts in the specification and throughout the several views.

Figure 1:
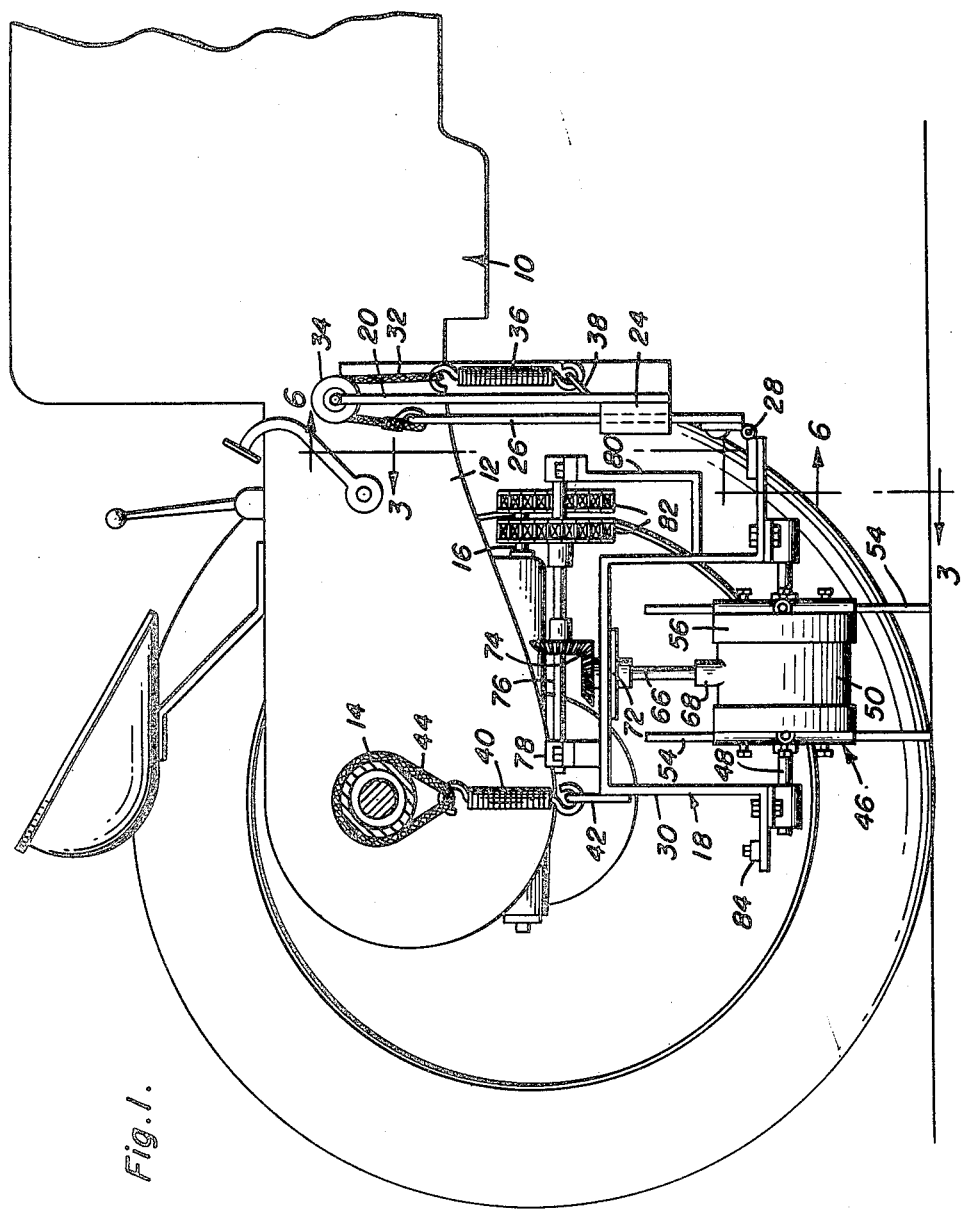
Figure 1 is a fragmentary longitudinal sectional view of a tractor showing the invention applied thereto.
Figure 2:
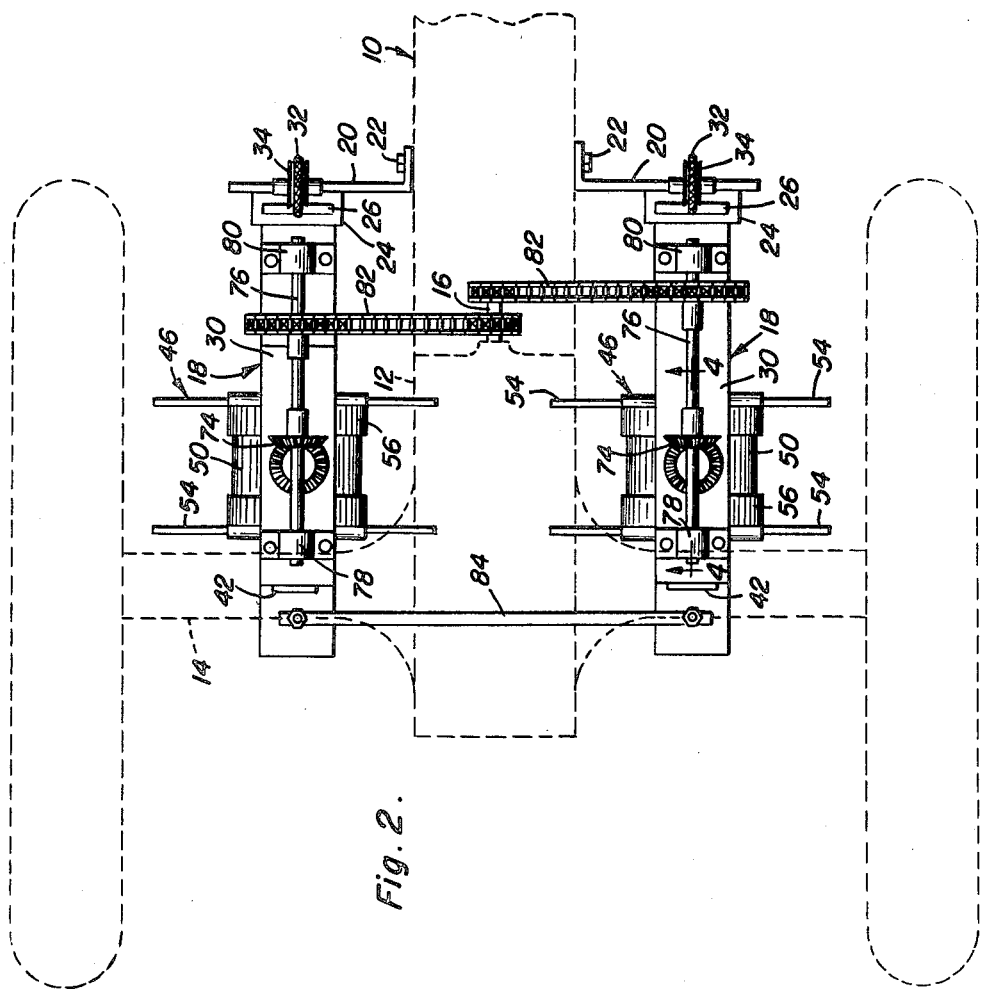
Figure 2 is a fragmentary top plan view of the subject shown in Figure 1.
Figure 6:
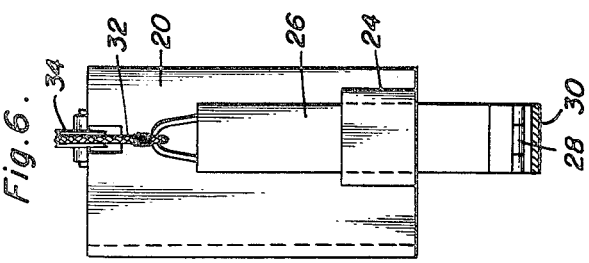
Figure 6 is a cross-sectional detail taken substantially in the plane of the line 6—6 in Figure 1.

Referring now to the accompanying drawings in detail, the general reference character 10 designates a conventional tractor including a frame 12, a rear axle housing 14 and a power-take-off shaft 16 which extends forwardly from the lower portion of the rear axle assembly, as will be clearly apparent.

The invention is embodied in a cotton chopper designated generally by the reference character 18, two of these units being employed on the tractor to facilitate performance of the chopping operation on two rows of cotton at the same time. Apart from the fact that the two chopper units 18 are disposed at relatively opposite sides of the tractor frame 12 and are left-handed and right-handed accordingly, they are similar in construction so that a description of one will suffice for both.

Each of the chopper units 18 involves the provision of an angle bracket 20 which is secured as at 22 to one side of the tractor frame 12 and extends downwardly therefrom, its lower portion being provided with an open ended, vertically elongated sleeve 24 to slidably accommodate a guide bar 26. The lower end portion of this guide bar is provided with a hinge 28 whereby it is connected to the front end of an inverted U-shaped carrier 30, while the upper end of the bar 26 has connected thereto a cable 32 which, after passing over a pulley 34 rotatably mounted at the upper edge of the bracket 20, is attached to a tension spring 36, as is illustrated in Figure 1. This spring, in turn, is anchored to a lug 38 struck out from the body of the bracket 20, and it will be apparent from the foregoing that by virtue of this resilient mounting and by virtue of the slidable bar 26 and the hinge 28, the carrier 30, suspended from the tractor frame 12, is able to move upwardly and downwardly so that the cotton chopping members (hereinafter described) which are mounted on the carrier 30 are free to follow the contour of the ground. In other words, the weight of the carrier and the chopper unit thereon is adequate to maintain the chopper unit in engagement with the soil against the resiliency of the spring 36, but if the soil rises, the spring is in readiness to assist the carrier in a corresponding rising movement, so that the blades of the chopper unit do not become embedded too deeply in the ground.

The rear portion of the carrier 30 is similarly suspended from the tractor, this being effected by means of a further tension spring 40 which is anchored at one end to the carrier as at 42 while its remaining end is connected to a loop 44 extending around the rear axle housing 14 as shown. The cotton chopping unit or member is designated generally by the reference character 46 and is mounted upon an axle 48 supported by the carrier 30 in such a position that it is substantially parallel to the longitudinal axis of the tractor.

The member or unit 46 embodies in its construction a substantially cylindrical, open ended housing 50 which surrounds the axle 48 while a pair of discs 52 are rotatably positioned on the axle 48 at the opposite ends of the housing 50, as is best shown in Figure 4. These discs are provided with radial sockets 53 to receive a plurality of chopping fingers 54 which are adjustably and removably secured in the sockets by set screws 55. The discs 52 are also provided with annular flanges 56 which, in turn, are equipped with annular groves 58 to rotatably accommodate the end portions of the housing 50, substantially as shown. In this manner the housing 50 is supported on the axle 48 notwithstanding the rotatability of the discs 52, the latter being rotatable in relatively opposite directions and rotation thereof being effected by providing each disc with a bevel gear 60 disposed in the housing 50 and secured to the associated disc by a plurality of screws or bolts 62. A tubular spacer 64 is positioned on the axle 48 between the two gears 60 and affords a bearing for the inner end of a drive shaft 66 which, being vertically disposed, extends into the housing 50 through a bearing box 68 with which the lateral wall of the housing is equipped.

The drive shaft 66 carries a bevel pinion 70 meshing with the gears 60 so that the discs 52 are rotated in relatively opposite directions, and it is to be noted that the carrier 30 affords an additional bearing for the drive shaft 66, as indicated at 72.

The drive shaft 66 is operatively connected by suitable gearing 74 to a countershaft 76 which is rotatably journaled in suitable brackets 78, 80 provided on the carrier 30, it being noted that the countershafts of the two units 18 are substantially parallel to the power take-off shaft 16, to which they are operatively connected by individual sprocket chain drives 82. These sprocket chain drives are, of course, sufficiently flexible to facilitate upward and downward movements of the carrier 30 and units 46 as necessitated by the irregularity of the ground. Finally, if desired, one or more transverse tie bars 84 may be employed for connecting together rear end portions of the carrier 30, these tie bars being connected to the carrier in a sufficiently loose or flexible manner to facilitate individual rising and falling movements of the carrier.

If desired, oil filled cases may be provided for the sets of gears 74, and it is to be noted that the fingers 54 need not be provided in all the sockets 53, thus affording a variation in the spacing between adjacent fingers as required by different soil conditions.

In order to prevent the discs 52 from moving on the axle 48 in a direction away from each other, collars 86 are disposed on each end of the axle 48 in abutting relationship to the outer faces of the discs 52. Set screws 88 retain the collars 86 in fixed position on the axle 48 and the collars 86 in combination with the spaces 64 retain the discs 52 in fixed axial position on the axle 48.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. The combination of a tractor including a frame and a power take-off shaft, and a cotton chopper comprising a vertically disposed sleeve secured to said tractor frame adjacent said shaft, a guiding bar slidable in said sleeve, a carrier extending forwardly and rearwardly under said tractor frame and hinged at its forward end to said guide bar, a resilient suspension element connecting said bar to said sleeve, a second resilient suspension element provided at the rear end of said carrier and connected to said tractor frame at a point spaced rearwardly from said sleeve, a forwardly and rearwardly extending axle mounted in said carrier, a pair of chopping members rotatable on said axle, and means operatively connecting said members to said power take-off shaft whereby said members may be rotated in relatively opposite directions.

2. In combination with a tractor having a frame and including a rear axle housing, a power take-off disposed centrally and forwardly of said housing, a plurality of cotton choppers suspended from said frame, each chopper including a carrier resiliently suspended from said frame, an axle journaled on said carrier and extending longitudinally of said frame, a pair of spaced parallel discs rotatably mounted on said axle, a plurality of radially extending cutting fingers detachably mounted on the outer face of each disc, driving means on said chopper connected to said power take-off rotating said discs in opposite directions, said driving means including a vertical shaft journalled on each carrier and terminating between said parallel discs, gear means operatively connecting said shaft and said discs.

3. In combination with a tractor having a frame and including a rear axle housing, a power take-off disposed centrally and forwardly of said housing, a plurality of cotton choppers suspended from said frame, each chopper including a carrier resiliently suspended from said frame, an axle journaled on said carrier and extending longitudinally of said frame, said carrier being of inverted U-shape, the ends of said axle being journaled in and extending between the free ends of the U, a pair of spaced parallel discs rotatably mounted on said axle, a plurality of radially extending cutting fingers detachably mounted on the outer face of each disc, driving means on said chopper connected to said power take-off rotating said discs in opposite directions, said driving means including a vertical shaft journalled on each carrier and terminating between said parallel discs, gear means operatively connecting said shaft and said discs.

4. The combination of a tractor having a frame and including a rear axle housing, a power take-off disposed centrally and forwardly of said housing, a cotton chopper comprising a carrier resiliently suspended from said frame for upward and downward movement with respect thereto, an axle journaled on said carrier and extending longitudinally of the tractor, a shaft mounted on said carrier and extending perpendicular to the axis of said axle, a pair of spaced, parallel chopping members rotatably mounted on said axle, said shaft extending between said chopping members, and means operatively connecting said chopping members and said shaft to said power take-off whereby said members may be rotated in relatively opposite directions.

5. The combination of a tractor having a frame and including a rear axle housing, a power take-off disposed centrally and forwardly of said housing, a cotton chopper comprising a carrier resiliently suspended from said frame for upward and downward movement with respect thereto, an axle journaled on said carrier and extending longitudinally of the tractor, a shaft mounted on said carrier and extending perpendicular to the longitudinal axis of the tractor, a pair of spaced, parallel chopping members rotatably mounted on said axle, said shaft extending between said chopping members, a housing maintaining said chopping members in spaced relation, said shaft extending into said housing and means on said axle engaging said shaft fixedly positioning said chopping members on said axle, and means operatively connecting said chopping members and said shaft to said power take-off whereby said members may be rotated in relatively opposite directions.

6. The combination of a tractor having a frame and including a rear axle housing, a power take-off disposed centrally and forwardly of said housing, a cotton chopper comprising a carrier resiliently suspended from said frame for upward and downward movement with respect thereto, an axle journalled on said carrier and extending longitudinally of the tractor, a shaft mounted on said carrier and extending perpendicular to the longitudinal axis of the tractor, a pair of spaced parallel chopping members rotatably mounted on said axle, said shaft extending between said chopping members, a housing maintaining said chopping members in spaced relation, said shaft extending into said housing and means on said axle engaging said shaft fixedly positioning said chopping members on said axle, and means operatively connecting said chopping members and said shaft to said power take-off whereby said members may be rotated in relatively opposite directions, means for guiding vertical movement of said carrier on said frame.

7. The combination of a tractor having a frame and including a rear axle housing, a power take-off disposed centrally and forwardly of said housing, a cotton chopper comprising a carrier resiliently suspended from said frame for upward and downward movement with respect thereto, an axle journalled on said carrier and extending longitudinally of the tractor, a shaft mounted on said carrier and extending perpendicular to the longitudinal axis of the tractor, a pair of spaced parallel chopping members rotatably mounted on said axle, said shaft extending between said chopping members, a housing maintaining said chopping members in spaced relation, said shaft extending into said housing and means on said axle engaging said shaft fixedly positioning said chopping members on said axle, and means operatively connecting said chopping members and said shaft to said power take-off whereby said members may be rotated in relatively opposite directions, said chopping members including a pair of spaced discs, complementary opposed bevel gears on the inner face of each disc, a bevel gear on the end of said shaft engaging said disc bevel gears.

8. In a cotton chopper, the combination of an inverted U-shaped carrier, an axle journaled on and extending between the free ends of the carrier, a shaft disposed perpendicular to said axle and mounted on the central portion of said carrier, a pair of spaced, parallel discs mounted on said axle, cutting fingers detachably secured to the outer faces of said discs, a cylindrical housing surrounding said axle and maintaining said discs in spaced relation, bevel gears mounted on opposing faces of said discs, said shaft extending within said housing, a bevel pinion secured to said shaft and operatively engaging said bevel gears whereby said discs are rotated in opposite directions, means on said axle engaging said shaft and fixedly positioning said discs on the axle.

References Cited in the file of this patent

UNITED STATES PATENTS

| Number | Name | Date |
|---|---|---|
| 1,252,953 | Seamon | Jan. 8, 1918 |
| 2,048,196 | Phillips | July 21, 1936 |
| 2,307,310 | Tyler et al. | Jan. 5, 1943 |
| 2,400,562 | Marihart | May 21, 1946 |
| 2,491,304 | Evans | Dec. 13, 1949 |
| 2,516,794 | Neel | July 25, 1950 |